United States Patent
Jamshidi

[15] 3,664,104
[45] May 23, 1972

[54] FRUITS AND NUTS PICKING DEVICE

[72] Inventor: Khosrow Jamshidi, 124-4th Avenue, N. W., Faribault, Minn. 55021

[22] Filed: Mar. 24, 1971

[21] Appl. No.: 127,529

[52] U.S. Cl. ................................................56/332
[51] Int. Cl. ................................................A01g 19/08
[58] Field of Search ..............56/332, 333, 334, 335, 336, 56/328, 30, 31, 32, 13

[56] References Cited

UNITED STATES PATENTS

| | | | |
|---|---|---|---|
| 2,545,072 | 3/1951 | Denman | 56/332 |
| 2,711,625 | 6/1955 | Bullock | 56/332 |
| 2,775,088 | 12/1956 | Bullock | 56/332 |
| 2,968,907 | 1/1961 | Bernheim et al. | 56/332 |
| 3,473,312 | 10/1969 | Holt | 56/332 |

*Primary Examiner*—Russell R. Kinsey
*Attorney*—Orrin M. Haugen

[57] ABSTRACT

Apparatus for harvesting fruits from trees comprising first conduit means, coupling means adjacent a first end thereof and adapted for attachment to a source of vacuum. Throat means including inner and outer sleeve members are provided, the inner sleeve member having a fruit receiving opening at one end thereof, a generally flexible fruit receiving portion arranged inwardly of said fruit receiving opening and having an inwardly converging conical portion. The inwardly converging conical portion is arranged to have a minimum diameter which is not substantially greater than the diameter of the fruit being harvested. A generally rigid cylinder depends from the inwardly converging conical portion and is coupled to the inwardly converging conical portion at one end thereof. Aspirating openings are formed along the rigid cylinder adjacent the inwardly converging conical portion, and a second generally flexible sleeve or conical member is coupled to the rigid cylinder at the end opposite from the fruit receiving opening. This second flexible member is arranged to form a generally flexible closure in response to vacuum being applied through said aspirating openings. The outer sleeve is sealingly secured to the inner sleeve about axially spaced points disposed on opposite sides of said aspirating openings, and means defining a port are arranged on the wall of the outer sleeve with means for coupling said port to said first conduit means.

5 Claims, 4 Drawing Figures

PATENTED MAY 23 1972 3,664,104
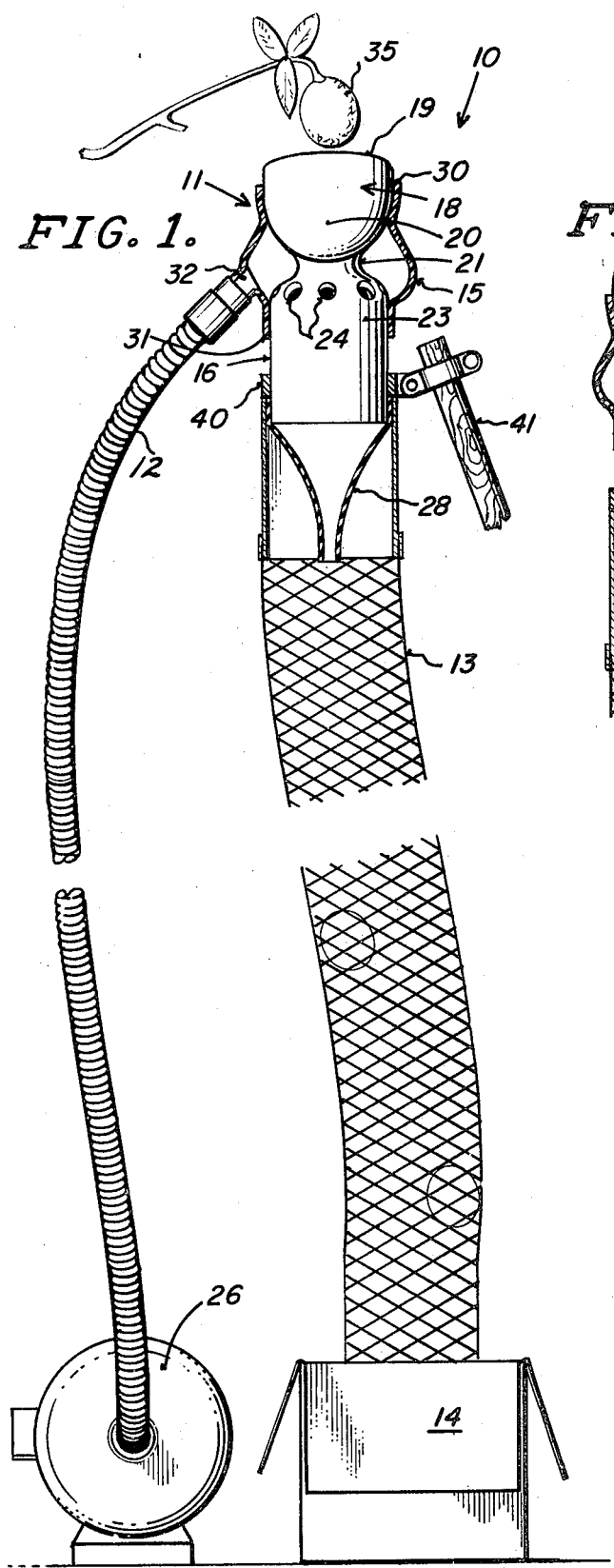
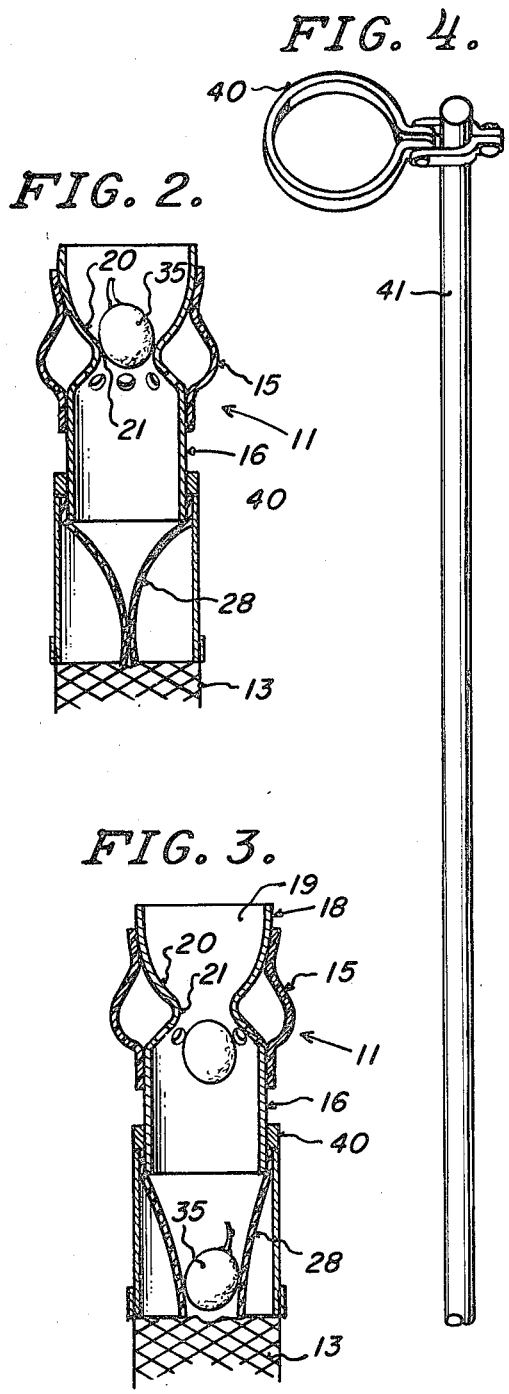
INVENTOR.
KHOSROW JAMSHIDI
BY
Orrin M. Haugen
ATTORNEY 3,664,104

FRUITS AND NUTS PICKING DEVICE

BACKGROUND OF THE INVENTION

The present invention relates generally to an improved apparatus for harvesting fruits and nuts from trees, wherein vacuum means are coupled to a flexible throat means for removing or detaching the fruit from the tree, and thereafter depositing the fruit in a collecting station. The apparatus of the present invention utilizes a source of vacuum as power for the unit, with the apparatus handling the picked fruit extremely gently.

In the harvesting of fruit, including both fruits and nuts, it is frequently desirable to utilize mechanical techniques which will eliminate the need for hand picking of each individual item from the tree. For certain fruits, hand picking is normally required in order to avoid blemishes from being formed on the fruit. Such hand picking is, of course, costly and extremely slow, and accordingly contributes to the high cost of such fruit to the consumer.

In the past, various techniques have been suggested for the harvesting and extraction of fruits from trees, however these apparatus frequently employ complex electromechanical devices including photocell sensors and the like for locating the fruit, and clamping arms for extracting the fruit from the growing tree. Such apparatus, while enhancing the speed of harvest, normally cannot avoid the risk of damage to the flesh of the fruit.

In accordance with the present invention, however, the risk of damage to the flesh is minimized, and a worker may harvest the fruit without necessarily leaving the ground. The apparatus is simple, light in weight, and may be handled from the ground by a suitable extension wand or the like.

SUMMARY OF THE INVENTION

Therefore, it is an object of the present invention to provide an improved fruit harvesting apparatus which will enable the picking of fruit or nuts from trees, the apparatus being designed to gently handle the fruit as it is taken from the tree.

It is yet a further object of the present invention to provide an improved apparatus for harvesting fruit and nuts from trees, this apparatus being operated and powered by a simple source of vacuum.

It is yet a further object of the present invention to provide an improved fruit and nut harvesting device which utilizes a structure without requiring mechanically moving parts.

Other and further objects of the present invention will become apparent to those skilled in the art upon a study of the following specification, appended claims, and accompanying drawing.

BRIEF DESCRIPTION OF THE DRAWING

FIG. 1 is a side elevational view, partially schematic, illustrating the improved fruit and nut harvesting device of the present invention, and illustrating the apparatus in combination with an elongated fruit transmission conduit means for delivering the harvested material to a collecting station;

FIG. 2 is a detail elevational view, partially broken away and partially in section, and illustrating the structure as it is about to extract or harvest fruit from a tree;

FIG. 3 is a view similar to FIG. 2, and illustrating the structure as individual items of harvested fruit are being passed through the gathering head; and FIG. 4 is an elevational view illustrating the manner in which the harvesting head can be releasably attached to an extension wand.

DESCRIPTION OF THE PREFERRED EMBODIMENT

Attention is now directed to FIG. 1 of the drawing wherein the harvesting apparatus generally designated 10 is illustrated, this apparatus including a harvesting head assembly generally designated 11, the harvesting head being coupled to a first conduit means 12, and a fruit guiding sleeve member 13. A collecting station in the form of a box or the like is shown at 14.

With particular attention being directed to the harvesting head means 11, this structure includes a throat assembly comprising a pair of generally coaxially arranged sleeves, including an outer sleeve 15, and an inner sleeve assembly 16. The inner sleeve assembly 16 includes a throat means shown generally at 18, the throat means having a fruit receiving opening as at 19, and an inwardly converging conical portion as at 20. The inwardly converging conical portion 20 has a minimum diameter or constriction area as at 21, this diameter being substantially equal to the diameter of the fruit being harvested. For normal purposes, this constriction is fabricated from flexible substances so that the diameter of the constriction is adjustably variable when vacuum is applied, this diameter being not substantially greater than the normal diameter of the fruit being harvested.

A generally rigid cylinder member 23 is arranged in depending relationship from the inwardly converging conical portion 20, cylinder 23 having a plurality of aspirating openings 24 around the periphery thereof. These openings are adapted to permit a flow of air to pass through, this flow being created by the operation of the vacuum means shown generally at 26. As can be seen in the harvesting head means, a second generally flexible member, preferably a conical member, is shown at 28, this member being coupled to the rigid cylinder at the end opposite to the inwardly converging conical portion. Member 28 is arranged to close upon itself, if desired, such as is illustrated in FIG. 2. For most purposes, member 28 may be fabricated from a flexible film substance such as flexible polyethylene, stress-oriented polyethylene terephthalate, or the like.

With continued attention being directed to FIG. 1, it will be seen that sleeve 15 is sealingly secured to sleeve 16 at axially spaced points disposed on opposite sides of the aspirating openings 24—24. These seal areas are shown as at 30 and 31. Also, means defining a port are arranged on the wall of the sleeve 15 as at 32, these port means being arranged to couple conduit 12 to the harvesting head 11.

Attention is now directed to FIG. 2 of the drawing wherein an item of fruit is shown at 35, with the fruit just entering the constriction formed in the inwardly converging conical opening 20, the circumference or surface of the fruit touching the constricted area 21, as illustrated. The vacuum means 26, drawing or aspirating upon the structure, tends to close the opening as at 28, while drawing the fruit 35 inwardly through the system. Upon passing through the opening 21, the fruit will drop through the harvesting head in the fashion shown in FIG. 3.

It can be appreciated, therefore, that opening 28 is adapted to intermittently open-and-close in response to the vacuum drawing on the structure, and in response to the blockage of the throat means at the constricted area 21. This blocking occurs whenever an article of fruit is present in the throat area.

In order to cushion the fall of the individual articles of fruit from the harvesting head into the collecting station, the fruit guiding sleeve 13 is arranged to control the fall of the individual articles and gently deposit them in the collecting box or station such as the box 14. In this fashion, fragile fruits may be collected without risking damage to the skin, flesh, or meat.

With attention being directed to FIG. 4, it can be appreciated how the harvesting head 11 may be secured by a closure ring or the like 40 to the wand 41. In this fashion, it is possible for an individual to harvest fruit or nuts from a tree without necessarily having to climb a ladder to ascend to a point where the individual articles of fruit can be harvested by hand.

While the present specification has discussed the gathering of fruit, it will be appreciated that the term "fruit" is being utilized in a generic sense, and is intended to include such fruits as apples, citrus fruits such as oranges, lemons and limes, as well as peaches and pears. By suitable selection of throat diameters, nuts can be harvested utilizing the identical principle. Any conventional materials of construction may be employed for the device, with molded plastic materials being preferred. The inwardly converging conical portion 20 may be fabricated from molded plastic such as nylon, Teflon, vinyl, or the like, while cylinder member 16 may be fabricated from similar materials. Outer sleeve 15, which is preferably rigid, can also be fabricated from any desired material of construction.

I claim:

1. Apparatus for harvesting fruits from trees comprising:
   a. first conduit means, coupling means adjacent a first end thereof and arranged for attachment to a source of vacuum;
   b. harvesting head means with throat means including inner and outer sleeve members, said inner sleeve member having a fruit receiving opening at one end thereof, a generally flexible fruit receiving portion disposed inwardly from said opening and having an inwardly converging conical portion, said inwardly converging conical portion having a minimum diameter which is not substantially greater than the normal diameter of the fruit being harvested, and a generally rigid cylinder depending from said inwardly converging conical portion and being coupled to said inwardly converging conical portion at one end thereof, means defining aspirating openings disposed along said rigid cylinder adjacent said inwardly converging conical portion;
   c. a second generally flexible conical member coupled to said rigid cylinder at the end opposite to said inwardly converging conical portion and adapted to form a generally flexible closure;
   d. said outer sleeve being sealingly secured to said inner sleeve at axially spaced points disposed on opposite sides of said openings; and
   e. means defining a port arranged on the wall of said outer sleeve and having means for coupling said outer sleeve member to said first conduit means.

2. The fruit harvesting apparatus as defined in claim 1 being particularly characterized in that a fruit guiding sleeve is secured to said rigid cylinder and depends therefrom so as to enclose said second conical member therewithin.

3. The fruit harvesting apparatus as defined in claim 1 being particularly characterized in that vacuum means are coupled to said first conduit means and are arranged to draw a vacuum through said aspirating openings.

4. The fruit harvesting apparatus as defined in claim 3 being particularly characterized in that said second generally flexible conical member is adapted to close upon itself in response to the vacuum drawn by said vacuum means through said aspirating openings.

5. The fruit harvesting apparatus as defined in claim 1 being particularly characterized in that said inwardly converging conical member is resiliently deformable.

* * * * *